(12) United States Patent
Lipski et al.

(10) Patent No.: US 10,899,601 B2
(45) Date of Patent: *Jan. 26, 2021

(54) RETAINING FRAME FOR A MULTICOUPLING FOR FILLING AND/OR DRAINING A CHEMICAL PLANT CONTAINER

(71) Applicant: Bayer Aktiengesellschaft, Leverkusen (DE)

(72) Inventors: Florian Lipski, Duesseldorf (DE); Gerhard Monscheuer, Leverkusen (DE); Lars Frye, Leichlingen (DE); Oliver Reinold, Leichlingen (DE); Yasar Guendogan, Cologne (DE); Reinhard Engelstaedter, Huerth (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,494

(22) Filed: Apr. 19, 2019

(65) Prior Publication Data

US 2019/0241423 A1    Aug. 8, 2019

Related U.S. Application Data

(63) Continuation of application No. 14/345,578, filed as application No. PCT/EP2012/068464 on Sep. 19, 2012, now Pat. No. 10,308,499.

(30) Foreign Application Priority Data

Sep. 20, 2011 (DE) .................. 10 2011 053 800

(51) Int. Cl.
*B67D 7/84* (2010.01)
*F16M 11/12* (2006.01)
(Continued)

(52) U.S. Cl.
CPC ............. *B67D 7/84* (2013.01); *B67D 7/0288* (2013.01); *B67D 7/38* (2013.01); *B67D 7/78* (2013.01);
(Continued)

(58) Field of Classification Search
CPC .......... B67D 7/84; B67D 7/0288; B67D 7/38; F16M 11/043; F16M 11/12;
(Continued)

(56) References Cited

U.S. PATENT DOCUMENTS

| 391,789 | A | ‡ | 10/1888 | Grant | F16L 39/00 |
| | | | | | 285/25 |
| 733,993 | A | ‡ | 7/1903 | Pettingell | F16L 39/00 |
| | | | | | 285/25 |

(Continued)

FOREIGN PATENT DOCUMENTS

| DE | 2242715 A1 ‡ | 3/1973 | ............. F17L 37/32 |
| DE | 2242715 A1 | 3/1973 | |

(Continued)

OTHER PUBLICATIONS

T. Blanchard, "Machine for Turning,&Wooden Sheaves and Pins for Ships' Tackle Blocks and Pulleys." Specification of Letters Patent No. 3, dated Aug. 1, 1836.‡

(Continued)

*Primary Examiner* — Timothy L Maust
*Assistant Examiner* — James R Hakomaki
(74) *Attorney, Agent, or Firm* — McBee Moore & Vanik IP, LLC

(57) ABSTRACT

A holding stand for a multicoupling for filling and/or emptying a chemical plant container is provided, having a mounting device for the essentially stationary fastening of the holding stand and at least one compensating device, couplable indirectly or directly to the multicoupling, for (Continued)

varying a position of the multicoupling in relation to the mounting device in the vertical direction and/or in the horizontal direction and/or for varying an angular position of the multicoupling in relation to the mounting device about a vertical and/or horizontal axis of rotation. It thereby becomes possible for a multicoupling to be coupled simply.

10 Claims, 4 Drawing Sheets

(51) Int. Cl.
| | | |
|---|---|---|
| *F16M 11/20* | (2006.01) | |
| *F16M 11/24* | (2006.01) | |
| *B67D 7/02* | (2010.01) | |
| *B67D 7/38* | (2010.01) | |
| *B67D 7/78* | (2010.01) | |
| *F16M 11/04* | (2006.01) | |

(52) U.S. Cl.
CPC ........... *F16M 11/043* (2013.01); *F16M 11/12* (2013.01); *F16M 11/2092* (2013.01); *F16M 11/24* (2013.01); *F16M 2200/04* (2013.01); *Y10T 137/87941* (2015.04)

(58) Field of Classification Search
CPC ............... F16M 11/2092; F16M 11/24; F16M 2200/04; Y01T 137/87941
USPC ......................................................... 141/284
See application file for complete search history.

(56) References Cited

U.S. PATENT DOCUMENTS

| | | | | |
|---|---|---|---|---|
| 937,961 | A ‡ | 10/1909 | Robinson | F16L 39/00 213/76 |
| 1,106,619 | A ‡ | 8/1914 | Blackburn | F16L 39/00 285/25 |
| 1,136,093 | A ‡ | 4/1915 | Bonham | F16L 39/00 137/312 |
| 1,161,403 | A ‡ | 11/1915 | Moler | F16L 39/00 248/53 |
| 1,221,682 | A ‡ | 4/1917 | Coffield | F16L 39/00 285/25 |
| 1,232,204 | A ‡ | 7/1917 | Brown | F16L 39/00 248/53 |
| 2,176,214 | A * | 10/1939 | Falge | G01M 11/061 356/122 |
| 2,176,215 | A * | 10/1939 | Falge | G01M 11/061 356/121 |
| 2,714,996 | A * | 8/1955 | Stroehman | B65H 16/06 242/559 |
| 2,932,478 | A ‡ | 4/1960 | Krieger | F16M 11/42 248/125.2 |
| 3,488,622 | A ‡ | 1/1970 | Gley | H01R 13/269 439/157 |
| 3,602,869 | A ‡ | 8/1971 | Metz | B62D 33/073 439/191 |
| 3,774,636 | A ‡ | 11/1973 | Arita | F16L 37/32 137/61 |
| 4,105,046 | A ‡ | 8/1978 | Sturgis | E02F 3/627 137/594 |
| 4,368,899 | A ‡ | 1/1983 | Smalley | B60D 1/04 280/421 |
| 4,573,502 | A ‡ | 3/1986 | Hurley | B65B 39/00 141/1 |
| 5,159,962 | A * | 11/1992 | Dow | B65B 3/04 141/174 |
| 5,316,347 | A ‡ | 5/1994 | Arosio | E02F 3/3654 285/124.4 |
| 5,344,194 | A ‡ | 9/1994 | Hatagishi | H01R 13/62933 285/26 |
| 5,378,282 | A ‡ | 1/1995 | Pollard | B05B 13/0431 118/323 |
| 5,404,923 | A ‡ | 4/1995 | Yamamoto | B64G 5/00 137/355.2 |
| 5,467,023 | A ‡ | 11/1995 | Takeyama | G01R 31/045 295/593 |
| 5,507,530 | A ‡ | 4/1996 | Mahaney | E02F 3/3654 285/124.1 |
| 5,614,820 | A ‡ | 3/1997 | Aoyama et al. | G01R 31/04 324/538 |
| 5,656,942 | A ‡ | 8/1997 | Watts | G01R 1/06705 324/750.19 |
| 6,017,065 | A ‡ | 1/2000 | Hellesøe | E21B 33/038 285/124.2 |
| 6,461,002 | B1 ‡ | 10/2002 | Su | F16M 11/10 248/188.4 |
| 6,595,552 | B1 ‡ | 7/2003 | Mortari | F16L 39/00 285/18 |
| 6,619,021 | B1 ‡ | 9/2003 | Chaney | A01D 1/142 56/10.9 |
| 6,813,851 | B2 ‡ | 11/2004 | Mieger | E02F 3/3654 37/417 |
| 7,021,668 | B2 ‡ | 4/2006 | Langenfeld | E02F 3/3654 285/124.1 |
| 7,124,656 | B2 ‡ | 10/2006 | Miller | F16M 11/08 74/5.1 |
| 7,503,727 | B2 ‡ | 3/2009 | Ingebretsen | F16L 1/20 405/169 |
| 8,245,740 | B2 ‡ | 8/2012 | Horn | G01N 1/18 141/130 |
| 8,430,139 | B2 ‡ | 4/2013 | Pell | F16L 37/36 141/231 |
| 8,991,872 | B2 ‡ | 3/2015 | Mahrenholz | F16L 39/00 285/124.3 |
| 2002/0066327 | A1 ‡ | 6/2002 | Nagai | F16C 29/063 74/89.33 |
| 2004/0052628 | A1 ‡ | 3/2004 | Thurneysen | B23Q 1/4852 414/699 |
| 2005/0110911 | A1 ‡ | 5/2005 | Childrey | F16M 11/10 348/794 |
| 2005/0116127 | A1 ‡ | 6/2005 | Chen | F16M 11/00 248/179.1 |
| 2005/0285390 | A1 ‡ | 12/2005 | Martin | F16L 37/56 285/124.5 |
| 2006/0001416 | A1 * | 1/2006 | West | B25J 9/023 324/750.22 |
| 2006/0022455 | A1 ‡ | 2/2006 | Mieger | B60D 1/62 285/124.5 |
| 2006/0061091 | A1 ‡ | 3/2006 | Osterloh | B01L 9/00 285/124.5 |
| 2006/0239677 | A1 ‡ | 10/2006 | Friedrich | F16M 11/043 396/419 |
| 2007/0269270 | A1 ‡ | 11/2007 | Bastesen | F16L 1/20 405/170 |
| 2008/0230671 | A1 ‡ | 9/2008 | Xing | F16M 11/10 248/425 |
| 2008/0246204 | A1 ‡ | 10/2008 | Wilkinson | B23Q 1/5412 269/61 |
| 2009/0032654 | A1 ‡ | 2/2009 | Tseng | F16M 7/00 248/188.4 |
| 2009/0322072 | A1 ‡ | 12/2009 | Tiberghien | F16L 37/56 285/24 |
| 2010/0183372 | A1 ‡ | 7/2010 | Coleman | E21D 9/005 405/184 |
| 2011/0303800 | A1 ‡ | 12/2011 | Sapper | F16M 11/10 248/70 |
| 2012/0313324 | A1 * | 12/2012 | Frickey | F41J 1/10 273/407 |

FOREIGN PATENT DOCUMENTS

| | | | | |
|---|---|---|---|---|
| EP | 1624116 A2 ‡ | 2/2006 | | B60D 1/62 |
| EP | 1624116 A2 | 2/2006 | | |

(56) References Cited

FOREIGN PATENT DOCUMENTS

JP          61014008 A    ‡   1/1986   ............ B21B 31/08
JP          61014008 A         1/1986

OTHER PUBLICATIONS

International Search Report received in corresponding PCT/EP2012/068464 dated Jan. 8, 2013.‡

Official Journal of the European Communities, Directive 1999/92/EC of the European Parliament and of the Council of Dec. 16, 1999 on minimum requirements for improving the safety and health protection of workers potentially at risk from explosive atmospers (15th individual Directive within the meaning of Article 16(1) of Directive 89/391EEC), L 23/57-L 23/64 (8 pages).‡

Directive 94/9/EC of the European Parliament and the Council of Mar. 23, 1994 on the approximation of the laws of the Member States concerning equipment and protective systems intended for use in potentially explosive atmosphers, 1994L0009-EN-01.01.2013-002.001-1, (39 pages).‡

Official Journal of the European Communities, Directive 1999/92/EC of the European Parliament and of the Council of Dec. 16, 1999 on minimum requirements for improving the safety and health protection of workers potentially at risk from explosive atmospheres {15th individual Directive within the meaning of Article 16(1) of Directive 89/391/EEC), L 23/57-L 23/64 (8 pages).

Directive 94/9/EC of the European Parliament and the Council of Mar. 23, 1994 on the approximation of the laws of the Member States concerning equipment and protective systems intended for use in potentially explosive atmospheres, 1994L0009-EN-01.01.2013-002.001-1, (39 pages).

\* cited by examiner
‡ imported from a related application

RETAINING FRAME FOR A MULTICOUPLING FOR FILLING AND/OR DRAINING A CHEMICAL PLANT CONTAINER

CROSS REFERENCE TO RELATED APPLICATIONS

This application is a Continuation of U.S. application Ser. No. 14/345,578, filed Mar. 18, 2014, which is a § 371 National Stage entry of International Application No. PCT/EP2012/068464, filed Sep. 19, 2012, which claims priority to German Patent Application No. 102011053800.3, filed Sep. 20, 2011. All of the above priority applications are hereby incorporated by reference in their entirety.

BACKGROUND

Field of the Invention

The present invention relates to a holding stand for a multicoupling for filling and/or emptying a chemical plant container, with the aid of which holding stand the multicoupling can be fastened.

Description of Related Art

US 2009/0322072 A1 discloses a multicoupling, with the aid of which a plurality of hoselines of a stationary side can be coupled simultaneously to matching hoselines of a movable side.

There is a constant need to simplify the coupling of a multicoupling.

SUMMARY

The object of the invention is to specify measures which make it possible to couple a multicoupling simply.

The object is achieved, according to the invention, by means of a holding stand for a multicoupling for filling and/or emptying a chemical plant container, having the features of Claim 1. Preferred refinements of the invention are specified in the subclaims.

According to the invention, a holding stand for a multicoupling for filling and/or emptying a chemical plant container is provided, having a mounting device for the essentially stationary fastening of the holding stand and at least one compensating device, couplable indirectly or directly to the multicoupling, for varying a position of the multicoupling in relation to the mounting device in the vertical direction and/or in the horizontal direction and/or for varying an angular position of the multicoupling in relation to the mounting device about a vertical and/or horizontal axis of rotation.

DETAILED DESCRIPTION OF A PREFERRED EMBODIMENT

Figure 1:
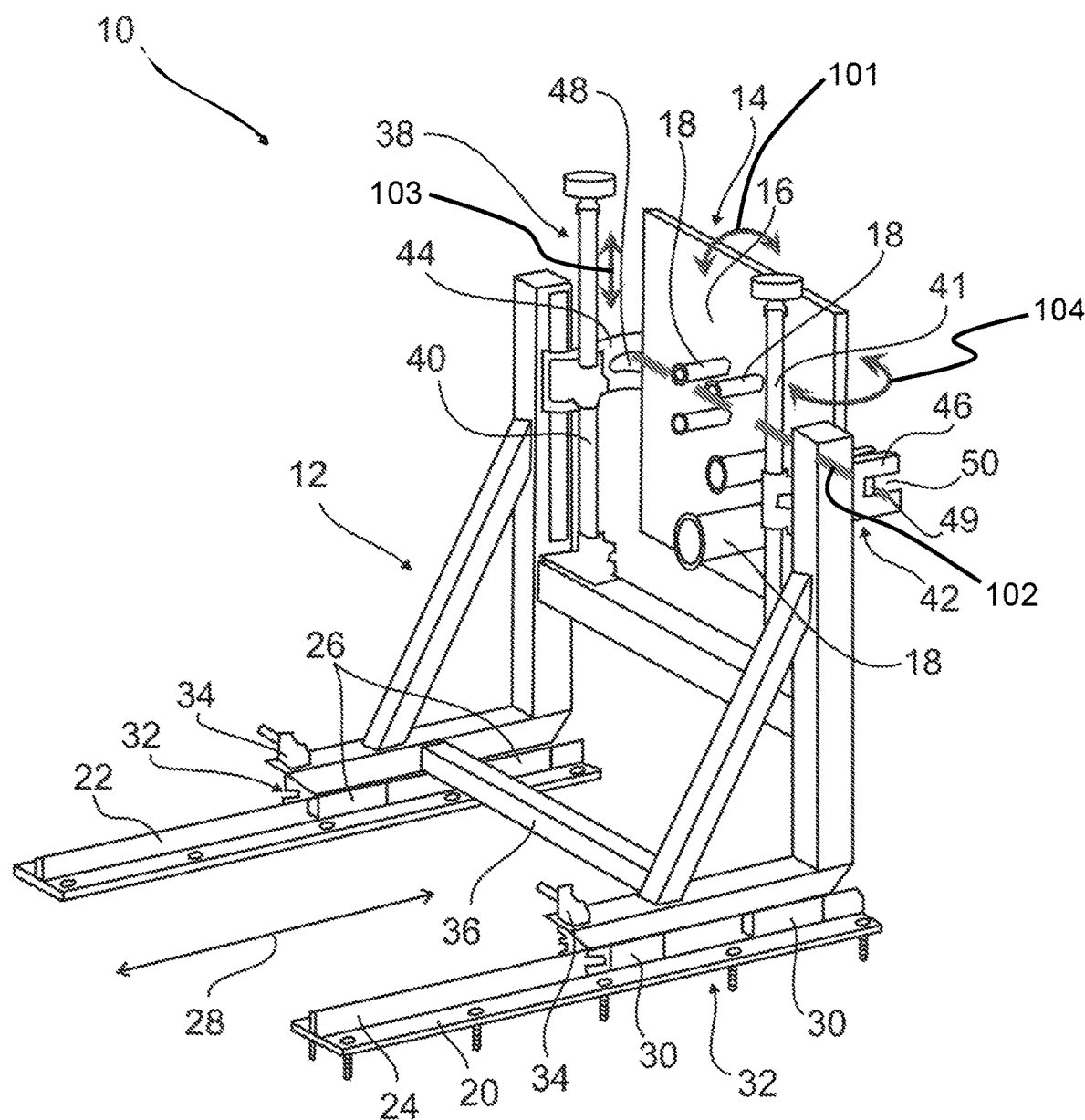
FIG. 1 shows a diagrammatic perspective view of a docking station.

By the multicoupling being fastened movably to the holding stand, a movable part to be coupled, in particular a chemical plant container for the accommodation and/or process treatment of substances and/or substance mixtures occurring in chemical plants, for example for carrying out a chemical reaction or a process engineering process, can be coupled in a simple way to an essentially immovable part, for example a supply plant for the provision of starting materials and for the accommodation of products, or to a likewise movable part, since inclinations and/or offsets can be compensated by means of the holding stand. The chemical plant container may accommodate, in particular, solid, liquid and/or gaseous substances or substance mixtures which are present in single-phase or multi-phase form, for example as a suspension or emulsion. The chemical plant container may have, in particular, a process engineering technique, for example for heating and/or cooling and/or mixing and/or separation and/or pressure regulation and/or aeration and/or deaeration, which preferably makes it possible in the chemical plant container to carry out a chemical reaction and to regulate intended reaction conditions. For example, a chemical plant container can be transported by an HGV to a supply plant, where the starting materials for a chemical reaction to be carried out inside the chemical plant container can be introduced and/or products present after carrying out the chemical reaction can be emptied. Inaccurate positioning and/or alignment of the HGV and/or of the chemical plant container transported by the HGV can be compensated with the aid of the holding stand. Furthermore, it is possible to compensate, preferably automatically, a fall or rise in the position of the chemical plant container even taking place during filling or emptying, as may occur as a result of the changing weight of the chemical plant container because of the compression or rebound of the latter in shock absorbers or other damper and/or spring elements. The situation can be avoided where a bulky and/or heavy movable part has to be oriented in a complicated way in order to bring about coupling. Simple coupling of a multicoupling is thereby made possible.

The mounting device may be configured, for example, as a component which can be stationarily connected releasably or unreleasably to a larger structural unit. The mounting device may be connected to a base 21 and/or a wall of a building, in particular a supply plant, or a wall of a transportable structural unit, in particular a chemical plant container. The multicoupling may have, for example, a holding plate, to which the at least one coupling is connected, the coupling penetrating through the holding plate. The multicoupling may have at least one coupling, the multicoupling having, in particular, a plurality of couplings, in particular plug connectors. With the aid of the respective coupling, in particular, hydraulic and/or pneumatic and/or electrical coupling to a matching coupling can be effected. The couplings couplable to one another are, in particular, designed as a male coupling which can be plugged into a female coupling, in which case the male coupling can be connected to the multicoupling, connected movably to the holding stand, and the female coupling can be connected to the multicoupling matching this, or vice versa. Preferably, a plurality of compensating devices are provided which in each case allow different defined displacements and/or pivotings of the multicoupling. The respective displacement of the respective compensating device may take place, for example, essentially exactly vertically or essentially exactly horizontally. It is also possible that displacement takes place obliquely to the horizontal and obliquely to the vertical with a fraction of movement in the horizontal direction and with a fraction of movement in the vertical direction. The respective pivoting of the respective compensating device may take place correspondingly, for example, about an axis of rotation which runs essentially exactly vertically or essentially exactly horizontally. It is also possible that the axis of rotation runs obliquely to the horizontal and obliquely to the vertical. The maximum displacement travel of a linear movement and/or the maximum angular amount of a rotation of a compensating device can be limited, in particular, with the aid of a corresponding preferably damped and/or sprung stop.

What is provided, in particular, as at least one compensating device is—a linear compensating device for the linear displacement of the multicoupling along a designated, in particular essentially horizontal contact direction for connecting a male coupling to a female coupling and/or
- a lift compensating device for the linear, in particular essentially vertical displacement of the multicoupling transversely to a designated, in particular essentially horizontal contact direction for connecting a male coupling to a female coupling and/or
- a transverse compensating device for the linear, in particular essentially horizontal offset of the multicoupling transversely to a designated, in particular essentially horizontal contact direction for connecting a male coupling to a female coupling and/or
- a tilt compensating device for pivoting the multicoupling about a tilt axis of rotation, in particular running essentially horizontally, transversely to a designated, in particular essentially horizontal contact direction, for connecting a male coupling to a female coupling and/or
- an oblique compensating device (42) for pivoting (101) the multicoupling (14) about an oblique axis of rotation (102), in particular running essentially vertically (103), transversely (104) to a designated, in particular essentially horizontal contact direction (28), for connecting a male coupling to a female coupling and/or
- a rotary compensating device for rotating the multicoupling about a rotary axis of rotation running transversely to a designated, in particular essentially horizontal contact direction for connecting a male coupling to a female coupling.

In particular, a plurality of individual compensating devices are provided, which can be actuated independently of one another and which are coupled to one another in such a way that the individual compensating movements of the compensating devices are superposed on one another. Furthermore, it is possible, by means of a single structural implementation, to form two or more compensating devices simultaneously. The particular technical advantage of using two or more compensating devices on a multicoupling is that the multicoupling can compensate very much more flexibly and adaptably inaccuracies in the position of a chemical plant container to be coupled to the multicoupling. This allows simpler and more efficient handling of a container to be coupled to the multicoupling, since, for direct coupling, the container only has to be set down in an approximate position and does not have to be positioned exactly, because slight position inaccuracies can be compensated by means of the multicoupling.

The designated contact direction is, in particular, a movement direction which a multicoupling matching the multicoupling connected to the holding stand has to execute in order to couple the two multicouplings to one another by a male coupling being plugged into a female coupling. The designated movement direction corresponds essentially to the orientation of the at least one coupling of the multicoupling. Preferably, the designated movement direction is oriented essentially horizontally, so that the chemical plant container can be docked to a stationary supply plant with the aid of a suitable vehicle via the multicoupling accommodated movably by the holding stand. Offsets and/or tilts can be compensated by means of the individual compensating devices. The individual compensating devices can, for example, be actuated by hand. However, it is also possible, by means of suitable sensor technology, for example with the aid of optical and/or electromagnetic sensors for detecting the position and attitude of the multicoupling to be docked in relation to the multicoupling accommodated in front of the holding stand, to determine in space the arrangement of the multicoupling to be docked in relation to the multicoupling accommodated in front of the holding stand and to actuate the individual compensating devices automatically with the aid of a controller provided for this purpose. This makes it possible without much outlay in terms of orientation, for example, to dock a chemical plant container to the multicoupling accommodated by the holding stand. In particular, with the aid of the individual compensating devices, the multicouplings to be coupled to one another can preferably automatically be oriented parallel to and in alignment with one another. Damage to one of the multicouplings during docking is thereby avoided.

Preferably, the linear compensating device has at least one sliding shoe, guided in a guide rail, for the linear displacement of the multicoupling, in particular the guide rail being formed by the mounting device. The maximum displacement travel of the sliding shoe can be limited by preferably damped and/or sprung ram protection. By means of the sliding shoe guided by the guide rail, a linear movement along the contact direction can be stipulated. For example, the mounting device is connectable to a base and, on the side pointing away from the base, forms the guide rail. In particular, the sliding shoe can be locked by means of the guide rail, so that forces occurring in the contact direction can be removed via this lock. Preferably, a first sliding shoe guided in a first guide rail and a second sliding shoe guided in a second guide rail are provided, so that the weight and the forces occurring can be better distributed. The first sliding shoe and the second sliding shoe may be connected rigidly to one another via a crossmember. However, it is also possible, by means of a suitable connection, to displace the first sliding shoe and the second sliding shoe along the guide rails to a different extent, at least over a limited distance, so that, as a result of the different displacement of the sliding shoes, pivoting of the multicoupling about an, in particular, vertical axis of rotation for the purpose of compensating an inclination can take place. The linear compensating device can thereby at the same time form the oblique compensating device.

Especially preferably, the lift compensating device has a first linear adjustment, configured particularly as a spindle drive, for the linear displacement of the multicoupling and a second linear adjustment, configured particularly as a spindle drive, for the linear displacement of the multicoupling, in particular the first linear adjustment being actuable independently of the second linear adjustment for providing a rotation of the multicoupling. Alternatively, it is possible that the lift compensating device has only exactly one linear adjustment, preferably configured as a spindle drive. By means of the linear adjustment, in particular, a lift offset in the vertical direction can be compensated. By means of the two linear adjustments, forces occurring can be better distributed. By means of the two linear adjustments actuable independently of one another, the linear adjustments can be adjusted by the amount of a different distance, with the result that rotation of the multicoupling about an, in particular, essentially horizontal axis of rotation along the contact direction can be achieved. The lift compensating device can thereby at the same time form the rotary compensating device.

In particular, a first holding arm for the pivotable mounting of the multicoupling and a second holding arm for the pivotable mounting of the multicoupling for the purpose of forming the tilt compensating device are provided, in particular the multicoupling being mountable by means of the first holding arm via a first long hole and by means of the second holding arm via a second long hole to form the oblique compensating device. Preferably, the multicoupling has projecting bearing bolts which are mounted pivotably on mutually opposite sides of the holding arms. As a result of a measure which can be implemented in a structurally simple way, tilt compensation about an, in particular, horizontal axis of rotation running transversely to the contact direction can take place. By means of the long holes, it is possible that the bearing bolts execute in the long holes an offset along the contact direction, for example in order, as a linear compensating device, to allow compensation along the contact direction. Especially preferably, the bearing bolts are moved in the long holes in different directions, in order, as an oblique compensating device, to allow compensation of an inclination. The particular technical advantage of using an oblique compensating device on a multicoupling is that the multicoupling can compensate, very much more flexibly and adaptably, inaccuracies in the position of a chemical plant container to be coupled to the multicoupling. This allows simpler and more efficient handling of a container to be coupled to the multicoupling, since, for direct coupling, the container only has to be set down in an approximate position and does not have to be positioned exactly, because slight position inaccuracies can be compensated by the multicoupling. This technical advantage is especially pronounced when, as a result of a single structural implementation, two or more compensating devices are used simultaneously. For example, a large chemical plant container does not have to be set down exactly in a specific place to the millimetre. Position inaccuracies in the centimetre range regularly occur when the container is being set down. Fine orientation of the container in relation to the multicoupling would be complicated, less efficient and time-consuming. The use of one, two or more compensating devices, in particular of an oblique compensating device, advantageously makes it possible to set down the container in an approximate position and to couple it directly to the multicoupling. In this case, position inaccuracies are compensated by means of one, two or more compensating devices, in particular an oblique compensating device.

The invention relates, furthermore, to a docking station for docking a chemical plant container to a supply plant, having a holding stand, which can be designed and developed, as described above, and a multicoupling accommodated movably by the holding stand and having at least one coupling. With the aid of the holding stand, it becomes possible for a multicoupling to be coupled simply. In particular, the docking station may be standardized, for example, as an industrial standard, so that many different chemical plant containers can be coupled to different supply plants and/or process engineering plants with the aid of the same docking technique. This affords overriding compatibility which, in particular, is offered within a chemical plant having a plurality of supply plants and/or process engineering plants and which makes it possible to have exchangeability of standardized components, this compatibility preferably being achievable even outside a delimited chemical plant, in particular internationally. The docking station may be used, in particular, for a multiplicity of different application ranges in which substance transport via the multicoupling can take place.

The invention relates, furthermore, to a docking station for docking a chemical plant container to a supply plant, having a holding stand, which may be designed and developed, as described above, a multicoupling accommodated movably by the holding stand and having at least one connecting coupling, and at least one conveying hose connected to the connecting coupling of the multicoupling, the conveying hose being connected at the end pointing away from the connecting coupling to a hose coupling positioned stationarily in relation to the mounting device of the holding stand, the conveying hose having between the hose coupling and the connecting coupling, at least in a subregion, an arcuate, in particular essentially semicircular run for the compensation of position changes and/or attitude changes of the multicoupling in relation to the mounting device. With the aid of the holding stand, it becomes possible for a multicoupling to be coupled simply. Owing to the arcuate run of the conveying hose, the conveying hose, simply by changing its radius of curvature, can follow the relative movement of the multicoupling with respect to the mounting device. Kinking, damage or excessively rapid wear of the conveying hose is avoided. In particular, the conveying hose can be stiffened and/or reinforced, so as to be able to withstand higher pressures of 2 bar, in particular 10 bar, preferably 20 bar and especially preferably 50 bar, without the reinforcing elements of the conveying hose being capable of being damaged as a result of the orientation of the multicoupling to which the conveying hose is connected. Preferably, the conveying hose is connected to the connecting coupling of the multicoupling divergently from the contact direction, in particular essentially in a horizontal direction transversely to the contact direction. Particularly when the conveying hose is connected to the hose coupling, which is preferably positioned in the contact direction essentially opposite to the connecting coupling of the multicoupling, likewise, in particular, essentially in a horizontal direction transversely to the contact direction, the conveying hose acquires an essentially arcuate or part-circular run. The essentially arcuate run of the conveying hose affords the technical advantage that the conveying hose is exposed to a stress profile which is very much lower, as compared with torsional movements. The arcuate, in particular essentially semicircular run of the conveying hose, without or with only very low torsion, avoids kinking, damage or excessive wear of the conveying hose. The conveying hose consequently has a very much longer service life, since higher stress upon conveying hoses due to multiple bends and simultaneous high torsion, which, of course, is avoided according to the invention, may lead to pronounced wear and premature failure of conveying hoses.

The essentially arcuate, in particular essentially semicircular run of the conveying hose may be made horizontal and/or inclined, in particular inclined in relation to the horizontal plane, so that liquids located in the conveying hose run back to the source of the liquid and cannot remain in the suspended hose and, in the form of a liquid plug, damage the plant when it is started up. As a result, the essentially arcuate run of the conveying hose, which is made at the same time horizontal and/or inclined, has both the technical advantage of avoiding wear of the hose and the technical advantage of avoiding liquid residues in the conveying hose.

The invention relates, furthermore, to a docking station for docking a chemical plant container to a supply plant, having a holding stand, which may be designed and developed, as described above, a multicoupling accommodated movably by the holding stand and having at least one connecting coupling, and at least one conveying hose connected to the connecting coupling of the multicoupling, the conveying hose being connected at the end pointing away from the connecting coupling to a hose coupling positioned stationarily in relation to the mounting device of the holding stand, the conveying hose running upwards, opposite to the direction of gravity, from the hose coupling to the connecting coupling. With the aid of the holding stand, it becomes possible for a multicoupling to be coupled simply. As a result of the upward run of the conveying hose from the hose coupling to the connecting coupling of the multicoupling, liquids present inside the conveying hose after filling or emptying can flow away from the connecting coupling of the multicoupling. In particular, condensates deposited in the conveying hose after filling or emptying can be kept away from the connecting coupling of the multicoupling. An escape of liquids during docking to the multicoupling can thereby be avoided. The gradient amounts, in particular, to at least 1%, preferably to at least 2%, further preferably to at least 3% and especially preferably to at least 5%. The gradient may, in particular, amount to a maximum of 10%.

In particular, a hose repository stand with a guide orifice for leading through the at least one conveying hose is provided, the guide orifice limiting a movability of the conveying hose in the direction of gravity and/or providing movability of the conveying hose transversely to the direction of gravity in order to compensate position changes and/or attitude changes of the multicoupling in relation to the mounting device. The guide orifice of the hose repository stand is, in particular, spaced apart from the hose coupling and the connecting coupling of the multicoupling, so that sagging of the conveying hose can be avoided. At the same time, an upward run of the conveying hose, at least in a subregion, can be ensured. The guide orifice of the hose repository stand may have a width in the horizontal direction such that the conveying hose, by varying its radius of curvature, can follow the relative movement of the multicoupling, without being bent round and/or pinched at a lateral boundary of the guide orifice.

The invention relates, furthermore, to a supply plant for the provision of starting materials and/or for the accommodation of products, the supply plant having a multicoupling accommodated movably by a holding stand, which may be designed and developed, as described above, and having at least one coupling, and/or a docking station, which may be designed and developed, as described above. With the aid of the holding stand, it becomes possible for a multicoupling to be coupled simply.

The invention relates, furthermore, to a chemical plant container for the accommodation and/or process treatment of substances and/or substance mixtures occurring in chemical plants, having a first multicoupling accommodated movably by a first holding stand, which may be designed and developed, as described above, and having at least one coupling, and/or a first docking station, which may be designed and developed, as described above, in particular, a second multicoupling accommodated movably by a second holding stand, which may be designed and developed, as described above, and having at least one coupling, and/or a second docking station, which may be designed and developed, as described above, being provided. The chemical plant container can accommodate, in particular, solid, liquid and/or gaseous substances or substance mixtures which are in single-phase or multi-phase form, for example as a suspension or emulsion. The chemical plant container may have, in particular, a process engineering technique, for example for heating and/or cooling and/or mixing and/or separation and/or pressure regulation and/or aeration and/or deaeration, which preferably makes it possible in the chemical plant container to carry out a chemical reaction and to regulate intended reaction conditions. The chemical plant container may be used, in particular, for carrying out batch reactions. For this purpose, the chemical plant container can be docked to a supply plant in order to introduce starting materials into the chemical plant container. After the end of the batch reaction or when a sufficiently low predefined rate of conversion is reached, the products which have occurred during the chemical reaction can be emptied out of the chemical plant container via the docked multicoupling. If the chemical plant container has at least two multicouplings or docking stations, continuous reaction is also possible, in that the starting materials are introduced, in particular, continuously or quasi-continuously via the first multicoupling and the products which have occurred are emptied, in particular, continuously or quasi-continuously via the second multicoupling. In particular, it is possible to connect a plurality of chemical plant containers in series via the multicouplings matching one another, so that a multi-stage essentially continuous chemical reaction or chemical engineering process can be achieved. In the embodiment of the invention, as described above, for example, two chemical plant containers can be connected to one another, while positioning inaccuracies occurring between the containers can be compensated by means of one or more compensating devices. Two or more containers can then be coupled to one another in this way. For example, the holding stand may have more than one multicoupling 14 for the coupling of more than one container.

The invention relates, furthermore, to a docking station for filling and/or emptying a chemical plant container, having a supply plant for the provision of starting materials and for the accommodation of products, the supply plant having a multicoupling accommodated movably by a holding stand, which may be designed and developed, as described above, and having at least one coupling and/or a docking station, which may be designed and developed, as described above, and a chemical plant container for the accommodation and/or process treatment of substances and/or substance mixtures occurring in chemical plants, which chemical plant container may be designed and developed, in particular, as described above, the chemical plant container having a multicoupling accommodated movably by a holding stand, which may be designed and developed, as described above, and having at least one coupling, and/or a docking station, which may be designed and developed, as described above, the multicoupling of the supply plant being couplable releasably to the multicoupling of the chemical plant container. With the aid of the holding stand, it becomes possible for the multicouplings to be coupled simply. In particular, changes in position occurring even during filling or emptying can be compensated.

In principle, the above-described holding stand according to the invention, the docking station according to the invention, the chemical plant container according to the invention and the above-described docking system according to the invention may be designed and constructed in accordance with the "ATEX" EU directives (EU directives 94/9/EG and 1992/92/EG on explosion protection). This means, in particular, that all surfaces can be electrically dischargeable within the required limits and can have sufficient electrical earthing. Moreover, the holding stand according to the invention can be manufactured from steel, not from aluminium. Aluminium in combination with corroded iron may generate impact sparks, to be avoided in terms of improved explosion protection. This ought not to occur in a structure which is to be operated in an EX region. For the invention to be used in the chemical sector, therefore, an ATEX license is of great advantage. It is precisely in chemical companies where combustible and easily ignitable substances are often employed which, in the correct mixture ratio with ambient air, form explosive mixtures. So that the invention can be used in such an environment, an ATEX license is a statutory requirement. In one embodiment of the invention, therefore, the holding stand according to the invention, the docking station according to the invention, the chemical plant container according to the invention and the above-described docking system according to the invention can be designed and constructed in accordance with the "ATEX" EU directives so as to be capable of being used even in a region at risk of explosion.

The invention is explained below by way of example by means of preferred exemplary embodiments, with reference to the accompanying drawings, while the features presented below may illustrate an aspect of the invention in each case individually and in combination.

Figure 2:
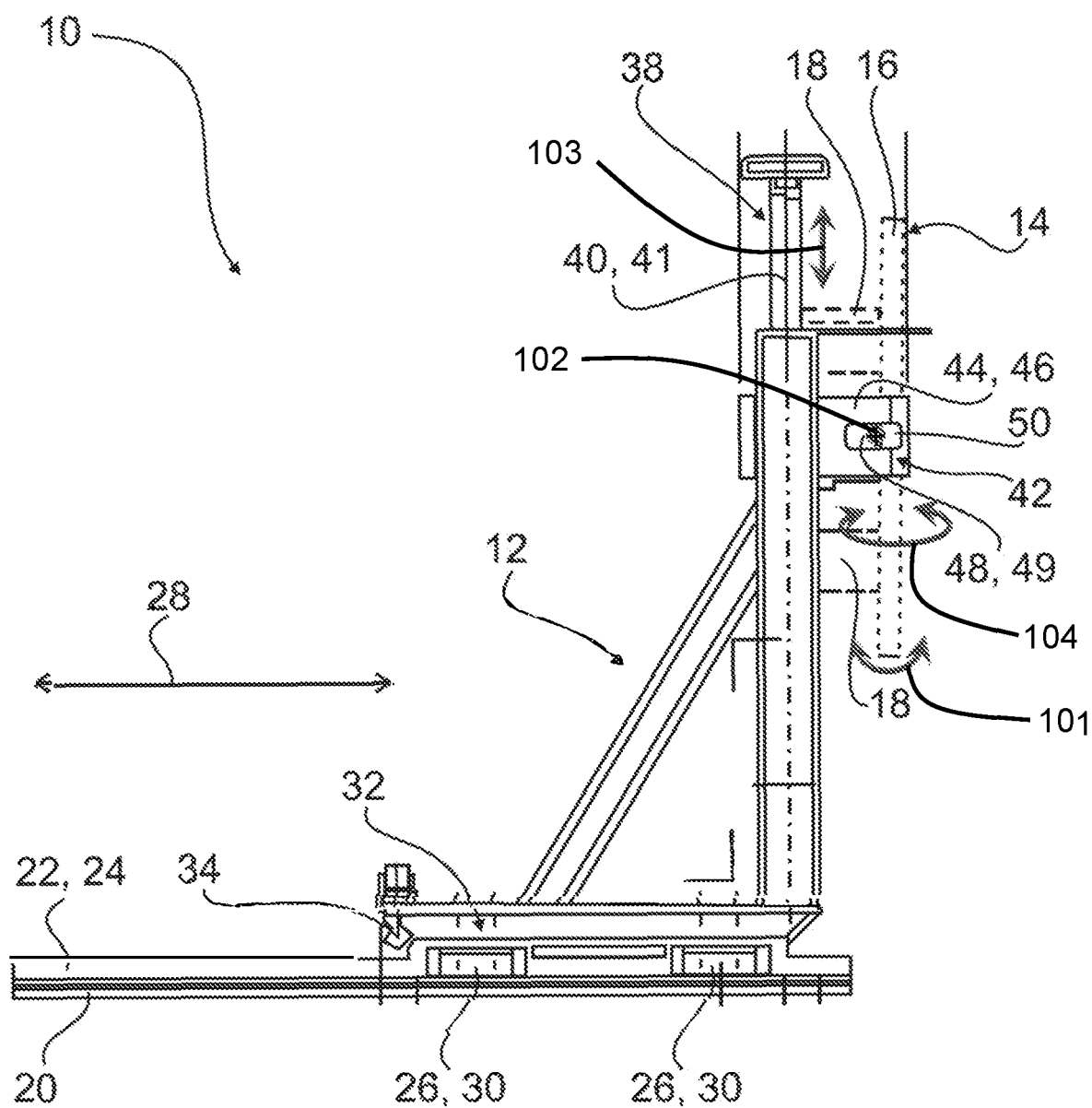
FIG. 2 shows a diagrammatic side view of the docking station from FIG. 1.

The docking station 10 illustrated in FIG. 1 and FIG. 2 has a multicoupling 14 held movably by a holding stand 12. The multicoupling 14 has a holding plate 16 through which penetrates a plurality of couplings 18 of various kinds. The docking station 10 can be firmly connected via a mounting device 20, for example, to a base 21 of a supply plant or to a wall and/or a bottom of a chemical plant container. The mounting device 20 forms a first guide rail 22 and a second guide rail 24. By means of the first guide rail 22, two first sliding shoes 26 are guided linearly along an essentially horizontally running contact direction 28. Correspondingly, by means of the second guide rail 24, two second sliding shoes 30 are guided linearly along the contact direction 28. The guide rails 22, 24 and the sliding shoes 26, 30 form a linear compensating device 32, with the aid of which a relative position of the multicoupling 14 with respect to the mounting device 20 can be set. The sliding shoes 26, 30 can be locked in an intended position with the aid of locking devices 34. In the exemplary embodiment illustrated, the first sliding shoes 26 are coupled rigidly to the second sliding shoes 30 via a crossmember 36.

The docking station 10 additionally has a lift compensating device 38 for compensating an offset of the multicoupling 14 in the vertical direction, which lift compensating device has, in the exemplary embodiment illustrated, two first linear adjustments 40 and second linear adjustment 41 actuable independently of one another and taking the form of spindle drives. As a result of different actuation of the linear adjustments 40, 41, the multicoupling 14 can be rotated about an essentially horizontal axis of rotation along the contact direction 28, so that the lift compensating device 38 at the same time forms a rotary compensating device for rotating the multicoupling 14.

A tilt compensating device 42 is connected to the lift compensating device 38. The tilt compensating device 42 has a first holding arm 44 connected to the first linear adjustments 40 and a second holding arm 46 connected to the second linear adjustments 41, which holding arms have respectively a first long hole 48 and a second long hole 49 extending in the contact direction 28. Bearing bolts 50 connected to the holding plate 16 of the multicoupling 14 are mounted pivotably in the long holes 48, 49, so that the multicoupling 14 can be tilted about an essentially horizontal axis of rotation transversely to the contact direction 28. By means of an offset of the bearing bolts 50 in different directions within the long holes 48, 49, an inclination of the multicoupling 14 can also be compensated, so that, with the aid of the long holes 48, 49, the tilt compensating device 42 can at the same time form an oblique compensating device for pivoting the multicoupling 14. Furthermore, between the holding plate 16 of the multicoupling 14 and the holding arms 44, 46, a play may be provided, which is sufficiently large, to ensure that the multicoupling 14 can be displaced in an essentially horizontal direction transversely to the contact direction 28 for the compensation of a transverse offset. For this purpose, the bearing bolts 50 have sufficient length so that both bearing bolts 50 remain accommodated in both long holes 48, 49 of the holding arms 44, 46 even in the extreme lateral positions. The tilt compensating device 42 can thereby at the same time form a transverse compensating device for linearly offsetting the multicoupling 14 transversely to the contact direction 28. The holding stand 12 makes it possible for the multicoupling 14 to be displaced linearly in three different coordinate directions and to be rotated in three different angular directions.

Figure 3:
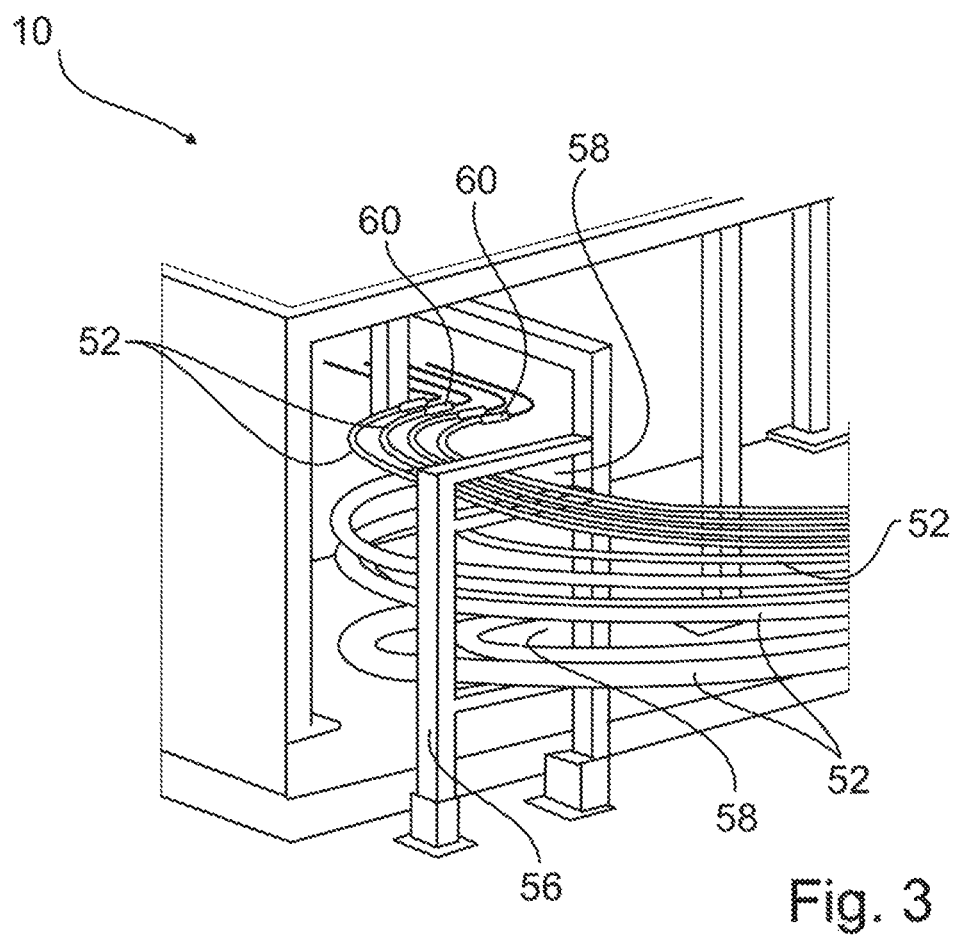
FIG. 3 shows a diagrammatic perspective view of a detail of a docking station.
Figure 4:
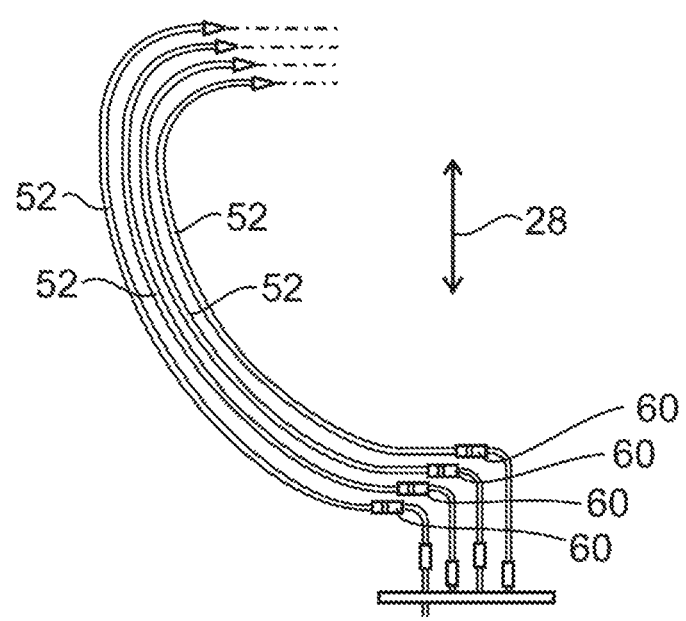
FIG. 4 shows a diagrammatic top view of conveying hoses of the docking station from FIG. 3.

As illustrated in FIG. 3, a plurality of conveying hoses 52 can be connected to respective connecting couplings 54 of the multicoupling 14. The conveying hoses 52 can be positioned in a curved run at a defined height with the aid of a holding stand 56. For this purpose, the holding stand 56 has, in particular, a plurality of guide orifices 58 in order to position various conveying hoses 52 at different heights. The guide orifices 58 allow displacement of the conveying hoses 52 in the horizontal direction, so that the conveying hoses 52 can change their radius of curvature illustrated in FIG. 4, in order to be able to follow the movements of the multicoupling 14 when the multicoupling 14 is being oriented. As illustrated in FIG. 4, the conveying hoses 52 can be connected essentially transversely with respect to the contact direction 28 to the connecting couplings 54 of the multicoupling and to the hose coupling 60 connected to that end of the conveying hose 52 which is opposite the connecting coupling 52, so that an arcuate run of the conveying hoses 52 is obtained essentially automatically.

Figure 5:
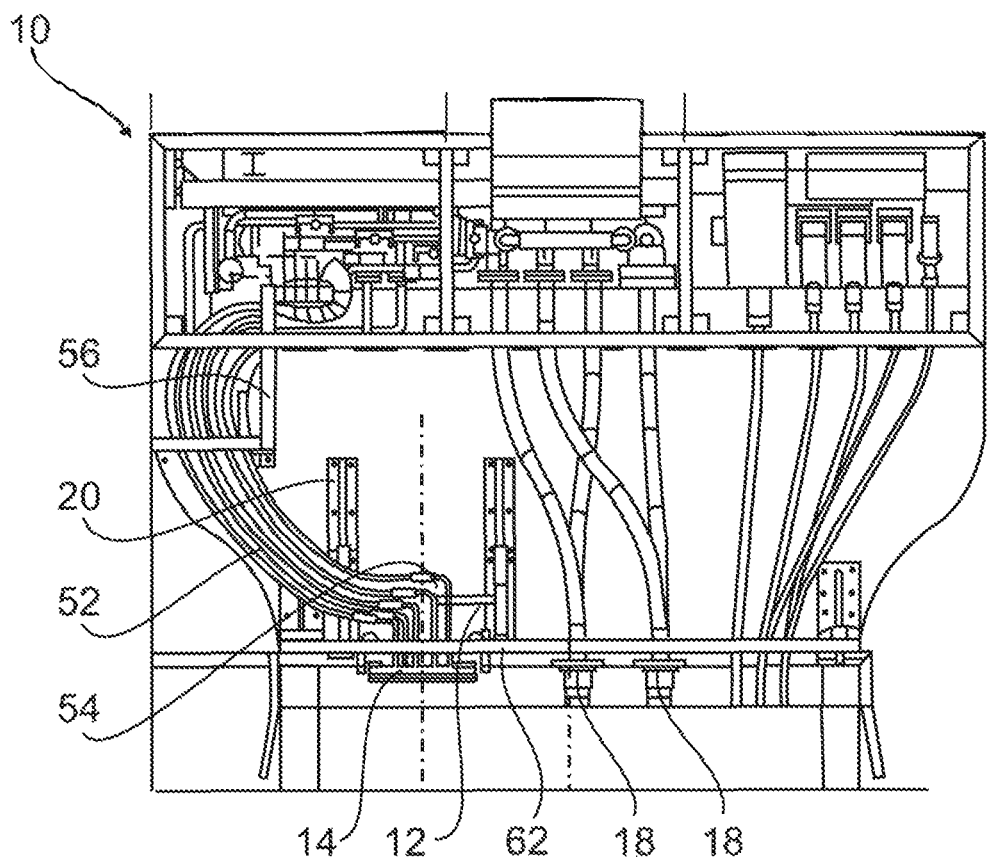
FIG. 5 shows a diagrammatic top view of the docking station from FIG. 3.

As illustrated in FIG. 5, the multicoupling 14 supported by the holding stand 12 may, if necessary, provide even only some of the couplings to be made. For this purpose, the holding stand 12 may be combined with a front stand 62, to which couplings 18, for example mono hose couplings, electrical plugs or the like, can likewise be connected.

Figure 6:
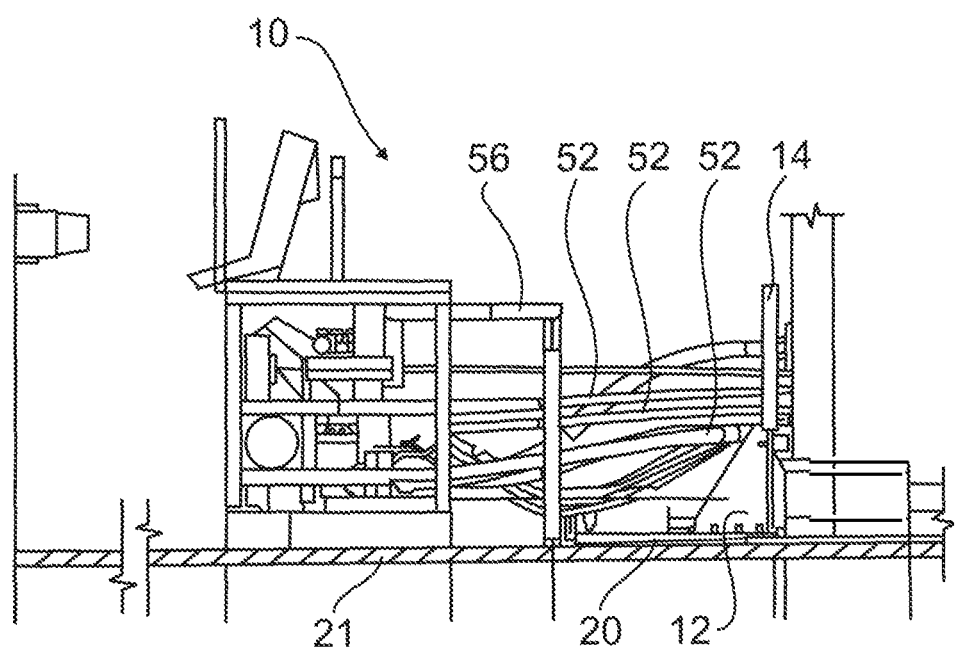
FIG. 6 shows a diagrammatic side view of the docking station from FIG. 3.

As illustrated in FIG. 6, the conveying hoses 52 can be oriented upwards to the multicoupling 14 with respect to a horizontal, so that liquids which, for example, are condensed out in the conveying hose 52 flow away from the multicoupling 14.

The invention claimed is:

1. A holding stand for a multicoupling for filling and/or emptying a chemical plant container, comprising
 a mounting device adapted for fastening of the holding stand;
 a first holding arm comprising a first long hole;
 a second holding arm comprising a second long hole;

a multicoupling comprising
 a holding plate, through which penetrates a plurality of couplings;
 a first bearing bolt connected to one side of the holding plate and pivotably mounted in the first long hole, and
 a second bearing bolt connected to an opposite side to the one side of the holding plate and pivotably mounted in the second long hole, and
at least one compensating device, couplable indirectly or directly to the multicoupling, for varying a position of the multicoupling in relation to the mounting device;
wherein the at least one compensating device comprises an oblique compensating device for pivoting the multicoupling about an oblique axis of rotation, wherein the first and second bearings bolts are moved in the first and second long holes in different directions as the oblique compensating device.

2. The holding stand of claim 1, wherein the at least one compensating device further comprises
 a linear compensating device for linear displacement of the multicoupling along an essentially horizontal contact direction for connecting a male coupling to a female coupling; and/or
 a lift compensating device for linear, essentially vertical displacement of the multicoupling transversely to an essentially horizontal contact direction for connecting a male coupling to a female coupling; and/or
 a transverse compensating device for linear, essentially horizontal offset of the multicoupling transversely to an essentially horizontal contact direction for connecting a male coupling to a female coupling; and/or
 a tilt compensating device for pivoting the multicoupling about a horizontal axis of rotation, running transversely to an essentially horizontal contact direction for connecting a male coupling to a female coupling; and/or
 a rotary compensating device for rotating the multicoupling about a rotary axis of rotation running transversely to an essentially horizontal contact direction for connecting a male coupling to a female coupling.

3. The holding stand of claim 2, wherein the linear compensating device comprises at least one sliding shoe, guided in a guide rail, for linear displacement of the multicoupling, wherein the guide rail is formed by the mounting device.

4. The holding stand of claim 2, wherein the lift compensating device comprises a first linear adjustment, configured as a spindle drive, for linear displacement of the multicoupling and a second linear adjustment, configured as a spindle drive, for linear displacement of the multicoupling, wherein the first linear adjustment is actuable independently of the second linear adjustment for providing a rotation of the multicoupling.

5. A docking station for docking a chemical plant container to supply plant, comprising the holding stand of claim 1, wherein the multicoupling is accommodated movably by the holding stand, comprising at least one connecting coupling, and at least one conveying hose connected to the at least one connecting coupling of the multicoupling, wherein the at least one conveying hose is connected at an end pointing away from the at least one connecting coupling to a hose coupling positioned stationarily in relation to the mounting device of the holding stand, and the at least one conveying hose comprising an arcuate, essentially semicircular run between the hose coupling and the connecting coupling, at least in a subregion, for the compensation of position changes and/or attitude changes of the multicoupling in relation to the mounting device.

6. A docking station for docking a chemical plant container to supply plant, comprising the holding stand of claim 1, wherein the multicoupling is accommodated movably by the holding stand, comprising at least one connecting coupling, and at least one conveying hose connected to the at least one connecting coupling of the multicoupling, wherein the at least one conveying hose is connected at an end pointing away from the at least one connecting coupling to a hose coupling positioned stationarily in relation to the mounting device of the holding stand, and the at least one conveying hose runs upwards, opposite to a direction of gravity, from the hose coupling to the connecting coupling.

7. The docking station of claim 5, further comprising a hose repository stand with a guide orifice for leading through the at least one conveying hose, wherein the guide orifice limits movability of the at least one conveying hose in a direction of gravity and/or provides movability of the at least one conveying hose transversely to a direction of gravity in order to compensate position changes and/or attitude changes of the multicoupling in relation to the mounting device.

8. The holding stand according to claim 1, wherein the holding stand comprises more than one multicoupling for coupling of more than one container.

9. The holding stand according to claim 1, wherein the holding stand is designed and constructed in accordance with the "ATEX" EU directives.

10. The holding stand according to claim 1, wherein the holding stand is manufactured from steel.

* * * * *